US011892762B2

(12) United States Patent
Lin et al.

(10) Patent No.: US 11,892,762 B2
(45) Date of Patent: Feb. 6, 2024

(54) PROJECTION APPARATUS

(71) Applicant: Coretronic Corporation, Hsin-Chu (TW)

(72) Inventors: Chun-Ting Lin, Hsin-Chu (TW); Wen-Yen Chung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/844,749

(22) Filed: Jun. 21, 2022

(65) Prior Publication Data

US 2023/0004075 A1 Jan. 5, 2023

(30) Foreign Application Priority Data

Jul. 2, 2021 (CN) .......................... 202121491359.5

(51) Int. Cl.
*G03B 21/16* (2006.01)
*G03B 21/14* (2006.01)
*G03B 21/00* (2006.01)
*G03B 21/20* (2006.01)

(52) U.S. Cl.
CPC ........... *G03B 21/16* (2013.01); *G03B 21/008* (2013.01); *G03B 21/145* (2013.01); *G03B 21/2013* (2013.01); *G03B 21/2033* (2013.01)

(58) Field of Classification Search
CPC .. G03B 21/16; G03B 21/0008; G03B 21/145; G03B 21/2013; G03B 21/2033
USPC .......................................................... 353/58
See application file for complete search history.

(56) References Cited

U.S. PATENT DOCUMENTS

| 9,261,770 | B2* | 2/2016 | Janssens | .............. H04N 9/3161 |
| 11,163,222 | B2* | 11/2021 | Chung | ................... G03B 21/16 |
| 2007/0024814 | A1* | 2/2007 | Woo | ........................ G03B 21/16 |
| | | | | 353/57 |

FOREIGN PATENT DOCUMENTS

| CN | 100407045 | 7/2008 |
| CN | 108427240 | 8/2018 |
| CN | 208752380 | 4/2019 |
| WO | WO-2022152300 A1 * | 7/2022 ............. G03B 21/16 |

OTHER PUBLICATIONS

Translation of WO 2022152300 (Year: 2023).*
Chun-Ting Lin et al., "Projection Device", Unpublished U.S. Appl. No. 17/178,245, filed Feb. 18, 2021, The specification, claims, and the drawings of the unpublished pending U.S. application.

* cited by examiner

*Primary Examiner* — Jerry L Brooks
(74) *Attorney, Agent, or Firm* — JCIPRNET

(57) ABSTRACT

A projection apparatus includes a casing, a projection lens, a first and a second light source modules, a first and a second thermal modules respectively thermally coupled to the first and the second light source modules, and a first and a second fans. The casing includes a bottom cover having a first air inlet corresponding to the projection lens, a front cover, a rear cover having a second air inlet, a first and a second side covers, which define an internal space divided into a first and a second areas. The first air inlet is connected to the internal space. A first air outlet of the first side cover and the second air inlet are connected to the first area. The first and the second light source modules, the first and the second thermal modules, and the first and the second fans are disposed in the first area.

20 Claims, 5 Drawing Sheets

PROJECTION APPARATUS

CROSS-REFERENCE TO RELATED APPLICATION

This application claims the priority benefit of Chinese application serial no. 202121491359.5, filed on Jul. 2, 2021. The entirety of the above-mentioned patent application is hereby incorporated by reference herein and made a part of this specification.

BACKGROUND

Technical Field

This disclosure relates to an optical apparatus, and particularly relates to a projection apparatus.

Description of Related Art

With the development of projection technology, users' requirements for the quality of the projected image (e.g., resolution, brightness, and color purity) are increasing, and accordingly, the heat generated by the operation of the light source and light valve is also increasing. In general, in order to improve the brightness or color purity, a common practice is to add other colors of laser diode (LD) light source, such as red laser diode, or other colors of light emitting diode (LED), such as red light emitting diode, resulting in a significant increase in the overall heat generated by the operation of the light source. In detail, the interior of the projection apparatus is equipped with thermal fin and fan, in which the thermal fins are thermally coupled to a heat source (e.g., a light source and a light valve) and the fan is configured to generate forced convection to bring outside cold air into the interior of the projection apparatus. Then, the cold air exchanges heat inside the projection apparatus to form hot air, and the hot air is forcibly exhausted by the fan.

In existing projection devices, the air inlet is located on the rear cover of the casing, while the air outlet is located on the side cover of the casing. To improve the heat dissipation efficiency and light output efficiency, the light source is located in the upstream of the flow field, and the projection lens is located roughly in the middle and downstream of the flow field in contrast. In other words, after the cold air enters from the air inlet to the interior of the casing, the cold air first exchanges heat with the light source to form hot air, and then flows to the air outlet. During the flow of hot air to the air outlet, the hot air flows through the projection lens, resulting in poor heat dissipation and thermal expansion of the projection lens, causing the focal length to drift, thus affecting the image quality. To solve the problem of heat expansion of the projection lens, the design of air inlet in the bottom cover of the casing has been proposed. However, because the bottom cover of the casing is close to the desktop and has a high flow resistance, it is not easy for cold air to enter the interior of the casing from the air inlet of the bottom cover, which has a limited effect on the heat dissipation of the projection lens.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection apparatus having favorable heat dissipation efficiency and capable of providing favorable image quality.

Other purposes and advantages of the disclosure may be further understood from the technical features disclosed in the disclosure.

In order to achieve one or part or all of the above objectives or other objectives, an embodiment of the disclosure provides a projection apparatus including a casing, a projection lens, a first light source module, a second light source module, a first thermal module, a second thermal module, a first fan, and a second fan. The casing includes a bottom cover, a front cover, a rear cover opposite to the front cover, a first side cover, and a second side cover opposite to the first side cover. The front cover, the rear cover, the first side cover, and the second side cover are disposed around the bottom cover and define an internal space. The projection lens is disposed in the casing. The bottom cover has a first air inlet connected to the internal space and corresponding to the projection lens, and the first air inlet is located between the front cover and the rear cover. An extension line of an optical axis of the projection lens divides the internal space into a first area and a second area. The rear cover has a second air inlet connected to the first area, and the first side cover has a first air outlet connected to the first area. The first light source module, the second light source module, the first thermal module, the second thermal module, the first fan, and the second fan are disposed in the first area. The first light source module is thermally coupled to the first thermal module. The first thermal module is located between the first air inlet and the first fan, and the first fan is located between the first thermal module and the first air outlet. The second light source module is thermally coupled to the second thermal module. The second thermal module is located between the second air inlet and the second fan, and the second fan is located between the second thermal module and the first air outlet.

Based on the above, the embodiments of the disclosure have at least one of the following advantages or effects. According to the embodiments of the disclosure, heat generated during operation of the first light source module and the second light source module is exhausted to outside of the casing through two different heat dissipation ways, thus helping to improve heat dissipation efficiency of the projection apparatus. Furthermore, the heat generated during the operation of the first light source module is transferred to the first thermal module, and then cold air flowing into the first area from the first air inlet of the bottom cover exchanges heat with the first thermal module to form hot air. On the other hand, the heat generated during the operation of the second light source module is conducted to the second thermal module, and then cold air flowing into the first area from the second air inlet of the rear cover exchanges heat with the second thermal module to form hot air. Finally, the hot air is exhausted from the internal space of the casing through the first air outlet of the first side cover. In addition, the cold air flowing into the first area from the first air inlet of the bottom cover cools the projection lens before flowing to the first thermal module. In other words, the projection lens is located upstream of flow field, so the projection lens may be cooled by cold air to avoid thermal expansion, thus improving the quality of the image projected by the projection apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A "Component is directly "adjacent to" "B" component or one or more additional components are between "A" component and "B" component. Accordingly, the drawings and descriptions will be regarded as illustrative in nature and not as restrictive.

Figure 1:
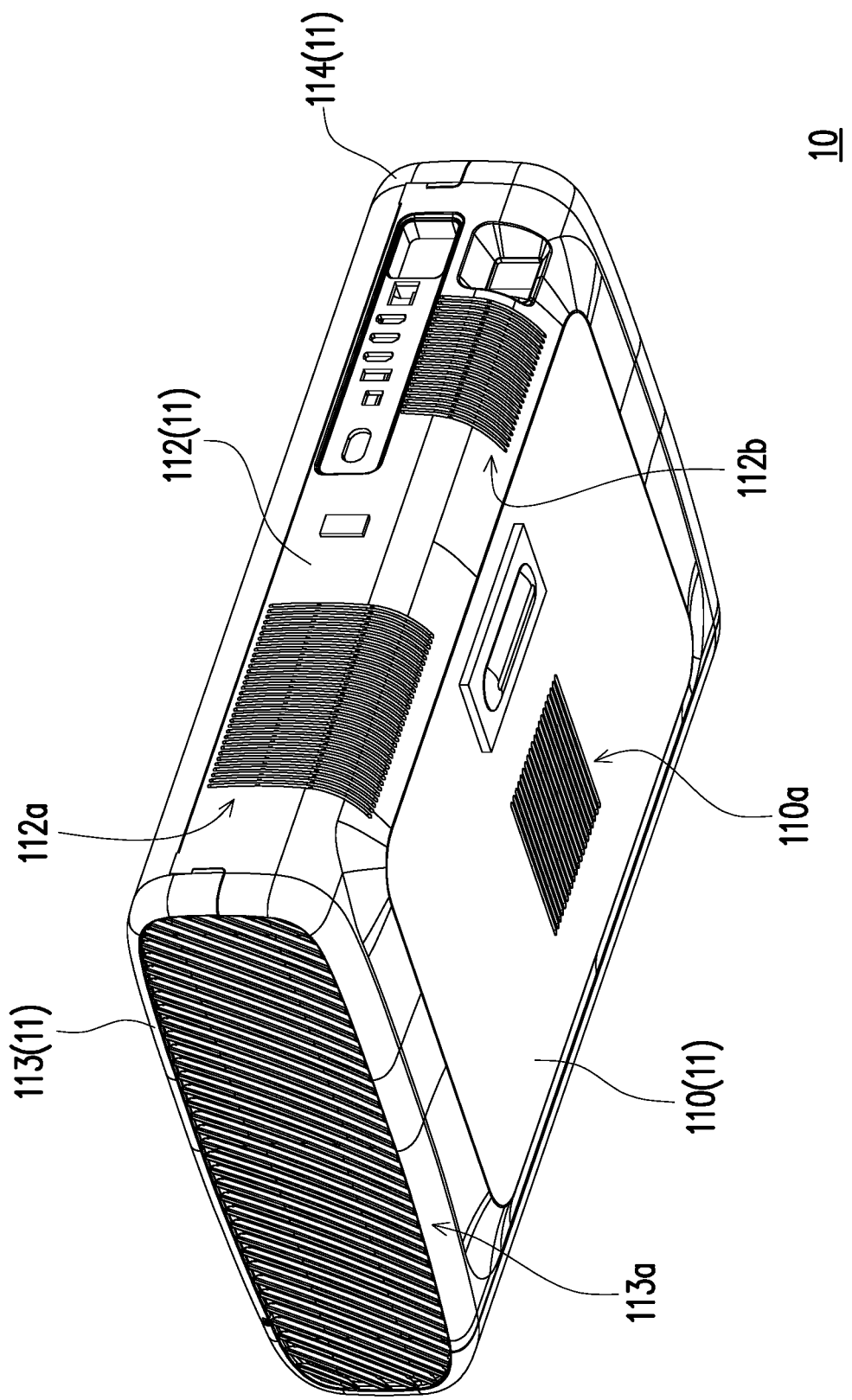
FIG. 1 and FIG. 2 are schematic views of a projection apparatus according to a first embodiment of the disclosure in two different viewing angles.
Figure 2:
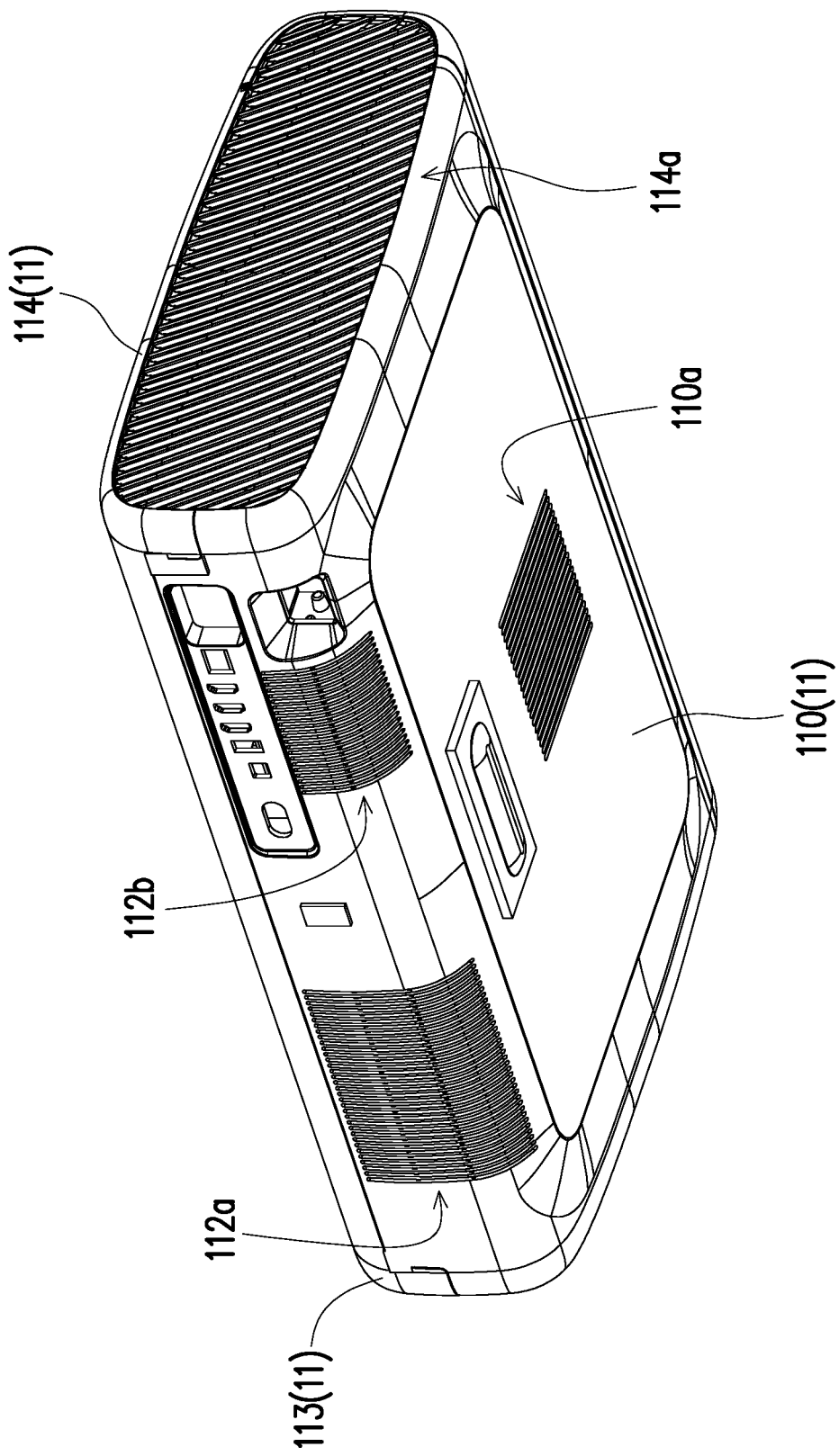
Figure 3:
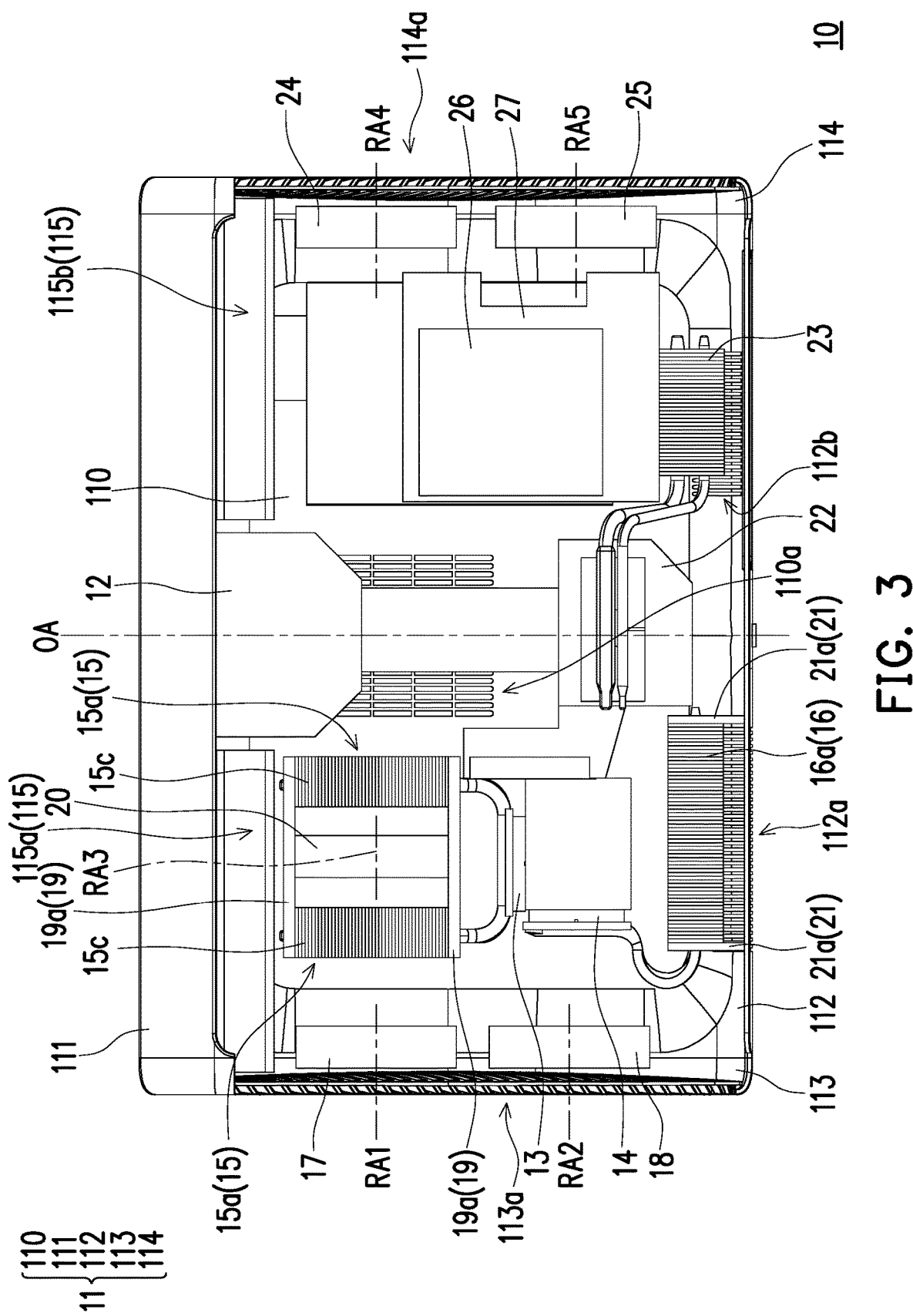
FIG. 3 is a schematic top view of the projection apparatus according to the first embodiment of the disclosure.

FIG. 1 and FIG. 2 are schematic views of a projection apparatus according to a first embodiment of the disclosure in two different viewing angles. FIG. 3 is a schematic top view of the projection apparatus according to the first embodiment of the disclosure. In particular, in order to clearly show internal configuration of a projection apparatus 10, a top cover of a casing 11 is omitted from FIG. 3. Referring to FIG. 1 to FIG. 3, according to this embodiment, the projection apparatus 10 includes the casing 11, a projection lens 12, a first light source module 13, a second light source module 14, a first thermal module 15, a second thermal module 16, a first fan 17, and a second fan 18. The projection lens 12, the first light source module 13, the second light source module 14, the first thermal module 15, the second thermal module 16, the first fan 17, and the second fan 18 are disposed in the casing 11.

Specifically, the casing 11 includes a bottom cover 110, a front cover 111, a rear cover 112 opposite to the front cover 111, a first side cover 113, and a second side cover 114 opposite to the first side cover 113. The front cover 111, the rear cover 112, the first side cover 113, and the second side cover 114 are disposed around the bottom cover 110, and define an internal space 115 for accommodating the projection lens 12, the first light source module 13, the second light source module 14, the first thermal module 15, the second thermal module 16, the first fan 17, and the second fan 18. In more detail, according to this embodiment, the casing 11 also includes a top cover (not shown), which is disposed opposite to the bottom cover 110. The internal space 115 is defined by the top cover, the bottom cover 110, and the first side cover 113, the second side cover 114, the front cover 111, and the rear cover 112 disposed around the top cover and the bottom cover 110. The bottom cover 110 has a first air inlet 110a connected to the internal space 115. The rear cover 112 has a second air inlet 112a connected to the internal space 115, and the first side cover 113 has a first air outlet 113a connected to the internal space 115. In addition, the first air inlet 110a is located between the front cover 111 and the rear cover 112, and is also located between the first side cover 113 and the second side cover 114.

The projection lens 12 is disposed corresponding to the first air inlet 110a of the bottom cover 110. The projection lens 12 is approximately located in a middle of the internal space 115, and may be a reflective ultra short throw projection lens or other types of projection lenses. Furthermore, an extension line of an optical axis OA of the projection lens 12 divides the internal space 115 into a first area 115a and a second area 115b. A part of the first air inlet 110a is connected to the first area 115a, and an other part of the first air inlet 110a is connected to the second area 115b. In addition, the second air inlet 112a of the rear cover 112 and the first air outlet 113a of the first side cover 113 are both connected to the first area 115a.

Referring to FIG. 1 and FIG. 3, according to this embodiment, the first light source module 13, the second light source module 14, the first thermal module 15, the second thermal module 16, the first fan 17, and the second fan 18 are disposed in the first area 115a. The first light source module 13 and the second light source module 14 each includes at least one red light emitting element, at least one blue light emitting element, and at least one green light emitting element. To further illustrate, the first light source module 13 and the second light source module 14 may each include, for example, at least one red laser diode, at least one blue laser diode, and at least one green laser diode. According to other embodiments, the first light source module 13 and the second light source module 14 each includes at least one Red LED, at least one Blue LED, and at least one Green LED. In addition, the at least one red light emitting element, the at least one blue light emitting element, and the at least one green light emitting element included by the first light source module 13 and the second light source module 14 may be, for example, a combination of a laser diode and a light emitting diode. The first light source module 13 is thermally coupled to the first thermal module 15, and the second light source module 14 is thermally coupled to the second thermal module 16. Therefore, heat generated during operation of the first light source module 13 and the second light source module 14 may be quickly exhausted from the first thermal module 15 and the second thermal module 16, respectively, to avoid overheating that affects light output efficiency and brightness.

The first fan 17 and the second fan 18 are configured corresponding to the first air outlet 113a. The first thermal module 15 is located between the first air inlet 110a and the first fan 17, and the first fan 17 is located between the first thermal module 15 and the first air outlet 113a. In other words, the first air inlet 110a, the first thermal module 15, the first fan 17, and the first air outlet 113a are disposed in sequence. On the other hand, the second thermal module 16 is located between the second air inlet 112a and the second fan 18, and the second fan 18 is located between the second thermal module 16 and the first air outlet 113a. In other words, the second air inlet 112a, the second thermal module 16, the second fan 18, and the first air outlet 113a are disposed in sequence.

Referring to FIG. 3, the first fan 17 and the second fan 18 may be axial fans, and are arranged on one side of the first air outlet 113a along a direction parallel to the optical axis OA of the projection lens 12. In addition, a rotation axis RA1 of the first fan 17 is parallel to a rotation axis RA2 of the second fan 18 and perpendicular to the extension line of the optical axis OA of the projection lens 12. When the first fan 17 is running, cold air may enter the internal space 115 from the first air inlet 110a, and flow from below the projection lens 12 to the first area 115a. Then, the cold air exchanges heat with the first thermal module 15 coupled to the first light source module 13 to form hot air. After that, the first fan 17 forces the hot air out of the first area 115a, and the hot air is exhausted from the first air outlet 113a.

Furthermore, since the projection lens 12 is configured corresponding to the first air inlet 110a, the cold air entering the internal space 115 from the first air inlet 110a may first cool the projection lens 12 before flowing to the first area 115a for heat exchange with the first thermal module 15. In other words, the projection lens 12 is located upstream of flow field, so the projection lens 12 may be cooled by the cold air to avoid thermal expansion, thus improving quality of an image projected by the projection apparatus 10.

On the other hand, when the second fan 18 is running, the cold air may enter the first area 115a from the second air inlet 112a and flow to the second thermal module 16. Then, the cold air exchanges heat with the second thermal module 16 coupled to the second light source module 14 to form hot air. After that, the second fan 18 forces the hot air out of the first area 115a, and the hot air is exhausted from the first air outlet 113a. In other words, the hot air formed after the heat exchange with the second thermal module 16 does not flow through the projection lens 12, but is exhausted directly from the first air outlet 113a, thus preventing the projection lens 12 from being unable to focus due to heat expansion.

Referring to FIG. 1 and FIG. 3, according to this embodiment, the projection apparatus 10 further includes a first air guider 19. The first air guider 19 is disposed in the first area 115a and is located between the first air inlet 110a and the first fan 17. Furthermore, the first air guider 19 covers the first thermal module 15. When the cold air flows into the first area 115a from the first air inlet 110a, the first air guider 19 may guide the cold air to completely flow through the first thermal module 15 to improve heat exchange efficiency.

On the other hand, the projection apparatus 10 further includes a third fan 20. The third fan 20 is disposed in the first area 115a and located between the first air inlet 110a and the first fan 17. Furthermore, the first air guider 19 covers the third fan 20. The third fan 20 may be an axial fan, and a rotation axis RA3 of the third fan 20 is parallel to the rotation axis RA1 of the first fan 17. When the third fan 20 is running, the cold air may enter the internal space 115 from the first air inlet 110a, and is forcedly driven by the third fan 20 to flow to the first thermal module 15.

Driven by the third fan 20 and guided by the first air guider 19, most of the cold air entering the internal space 115 from the first air inlet 110a may flow through the first thermal module 15 to improve heat exchange efficiency. In addition, after the cold air exchanges heat with the first thermal module 15 to form hot air, the third fan 20 drives the hot air to flow to the first fan 17. Finally, the first fan 17 forces the hot air out of the first area 115a, and the hot air is exhausted from the first air outlet 113a.

Referring to FIG. 3, according to this embodiment, the first thermal module 15 includes a thermal fin set 15a and a thermal fin set 15b in parallel, and the third fan 20 is disposed between the thermal fin set 15a and the thermal fin set 15b. Furthermore, the thermal fin set 15a is located between the first air inlet 110a and the third fan 20, and the thermal fin set 15b is located between the third fan 20 and the first fan 17. On the other hand, the thermal fin set 15a and the thermal fin set 15b each includes multiple thermal fins 15c, and the thermal fins 15c are arranged at intervals along the direction parallel to the optical axis OA of the projection lens 12 and each of the thermal fins 15c is parallel to the rotation axis RA3 of the third fan 20 to reduce flow resistance and improve heat exchange efficiency. The two thermal fin sets 15a and 15b of the first thermal module 15 are, for example, connected to the first light source module 13 through a heat pipe (not shown), and the heat pipe and the two thermal fin sets 15a and 15b, for example, form a U-shaped structure, and the first thermal module 15 is, for example, located between the first light source module 13 and the front cover 111.

For example, the first air guider 19 includes two side walls 19a, and the two side walls 19a are respectively disposed at two opposite sides of the first thermal module 15 along a direction perpendicular to the optical axis OA of the projection lens 12, and are disposed at two opposite sides of the third fan 20. In other words, the two side walls 19a are parallel to the rotation axis RA3 of the third fan 20 and parallel to the thermal fins 15c, so as to reduce flow resistance and improve heat exchange efficiency. According to another embodiment, the first air guider 19 is, for example, an inverse-U shaped cover and includes a top surface (not shown) connecting to two side walls 19a, so as to have a better air guiding effect.

Referring to FIG. 1 and FIG. 3, according to this embodiment, the projection apparatus 10 further includes a second air guider 21. The second air guider 21 is disposed in the first area 115a, and the second air guider 21 is connected to the rear cover 112 corresponding to the second air inlet 112a. On the other hand, the second thermal module 16 includes multiple thermal fins 16a, and the thermal fins 16a are arranged at intervals along the direction perpendicular to the optical axis OA of the projection lens 12, and each of the thermal fins 16a is parallel to a direction of an optical axis of the projection lens 12. The second air guider 21 covers the thermal fins 16a. When the cold air enters the first area 115a from the second air inlet 112a, the second air guider 21 may guide the cold air to flow through the second thermal module 16 to improve heat exchange efficiency. In detail, the second air guider 21 includes two side walls 21a. The two side walls 21a are respectively disposed at two opposite sides of the second thermal module 16 along the direction parallel to the optical axis OA of the projection lens 12, and are parallel to the thermal fins 16a, so as to reduce flow resistance and improve heat exchange efficiency. According to another embodiment, the second air guider 21 is, for example, an inverse-U shaped cover and includes a top surface (not shown) connecting to the two side walls 21a, so as to have a better air guiding effect.

According to this embodiment, the second light source module 14 is located between the first light source module 13 and the second air inlet 112a, and the second light source module 14 is closer to the second air inlet 112a than the first light source module 13 is. Furthermore, the heat generated during the operation of the first light source module 13 is transferred to the first thermal module 15, and then, the cold air flowing into the first area 115a from the first air inlet 110a exchanges heat with the first thermal module 15. In addition, the heat generated during the operation of the second light source module 14 is conducted to the second thermal module 16, and then, the cold air flowing into the first area 115a from the second air inlet 112a exchanges heat with the second thermal module 16. That is to say, the heat generated during the operation of the first light source module 13 and the second light source module 14 is exhausted to outside of the casing 11 through two different heat dissipation ways, so that both light source modules may achieve a good heat dissipation effect.

Referring to FIG. 2 and FIG. 3, according to this embodiment, the projection apparatus 10 further includes a digital micromirror device 22 and a third thermal module 23. The digital micromirror device 22 is disposed in the casing 11 and is approximately located in the middle of the internal space 115. The digital micromirror device 22 is thermally coupled to the third thermal module 23, and the third thermal module 23 is disposed in the second area 115b. Furthermore, the rear cover 112 further has a third air inlet 112b connected to the internal space 115, and the second side cover 114 has a second air outlet 114a connected to the internal space 115. Furthermore, the third air inlet 112b of the rear cover 112 and the second air outlet 114a of the second side cover 114 are both connected to the second area 115b, and the third thermal module 23 is located between the third air inlet 112b and the second air outlet 114a.

According to this embodiment, heat generated by the digital micromirror device 22 may be quickly exhausted by the third thermal module 23. Then, cold air entering the second area 115b from the third air inlet 112b exchanges heat with the third thermal module 23 to form hot air. After that, the hot air is exhausted from the second area 115b through the second air outlet 114a. Furthermore, the projection apparatus 10 further includes a fourth fan 24 and a fifth fan 25. The fourth fan 24 and the fifth fan 25 are disposed in the second area 115b, and are arranged on one side of the second air outlet 114a. The fourth fan 24 and the fifth fan 25 are located between the third thermal module 23 and the second air outlet 114a, and are configured to force hot air out of the second area 115b, and the hot air is exhausted from the internal space 115 through the second air outlet 114a. In addition, the fourth fan 24 and the fifth fan 25 may be axial fans and are arranged along the direction parallel to the optical axis OA of the projection lens 12. A rotation axis RA4 of the fourth fan 24 and a rotation axis RA5 of the fifth fan 25 are perpendicular to the extension line of the optical axis OA of the projection lens.

When at least one of the fourth fan 24 and the fifth fan 25 is running, the cold air may enter the second area 115b of the internal space 115 from the third air inlet 112b of the rear cover 112 and flow to the third thermal module 23. Then, the cold air exchanges heat with the third thermal module 23 to form hot air. After that, the at least one of the fourth fan 24 and the fifth fan 25 forces the hot air out of the second area 115b through the second air outlet 114a.

Referring to FIG. 2 and FIG. 3, according to this embodiment, the projection apparatus 10 further includes a driving circuit 26 and a power supply 27. The driving circuit 26 and the power supply 27 are disposed in the second area 115b of the internal space 115, and are located between the projection lens 12 and the second air outlet 114a. On the other hand, the fourth fan 24 and the fifth fan 25 are located between the driving circuit 26 and the second air outlet 114a, or between the power supply 27 and the second air outlet 114a. When the at least one of the fourth fan 24 and the fifth fan 25 is running, the cold air may enter the second area 115b from the third air inlet 112b, and flow to the driving circuit 26 and the power supply 27. Then, the cold air exchanges heat with the driving circuit 26 and the power supply 27 to form hot air. After that, the at least one of the fourth fan 24 and the fifth fan 25 forces the hot air out of the second area 115b, and the hot air is exhausted from the internal space 115 through the second air outlet 114a.

Figure 4:
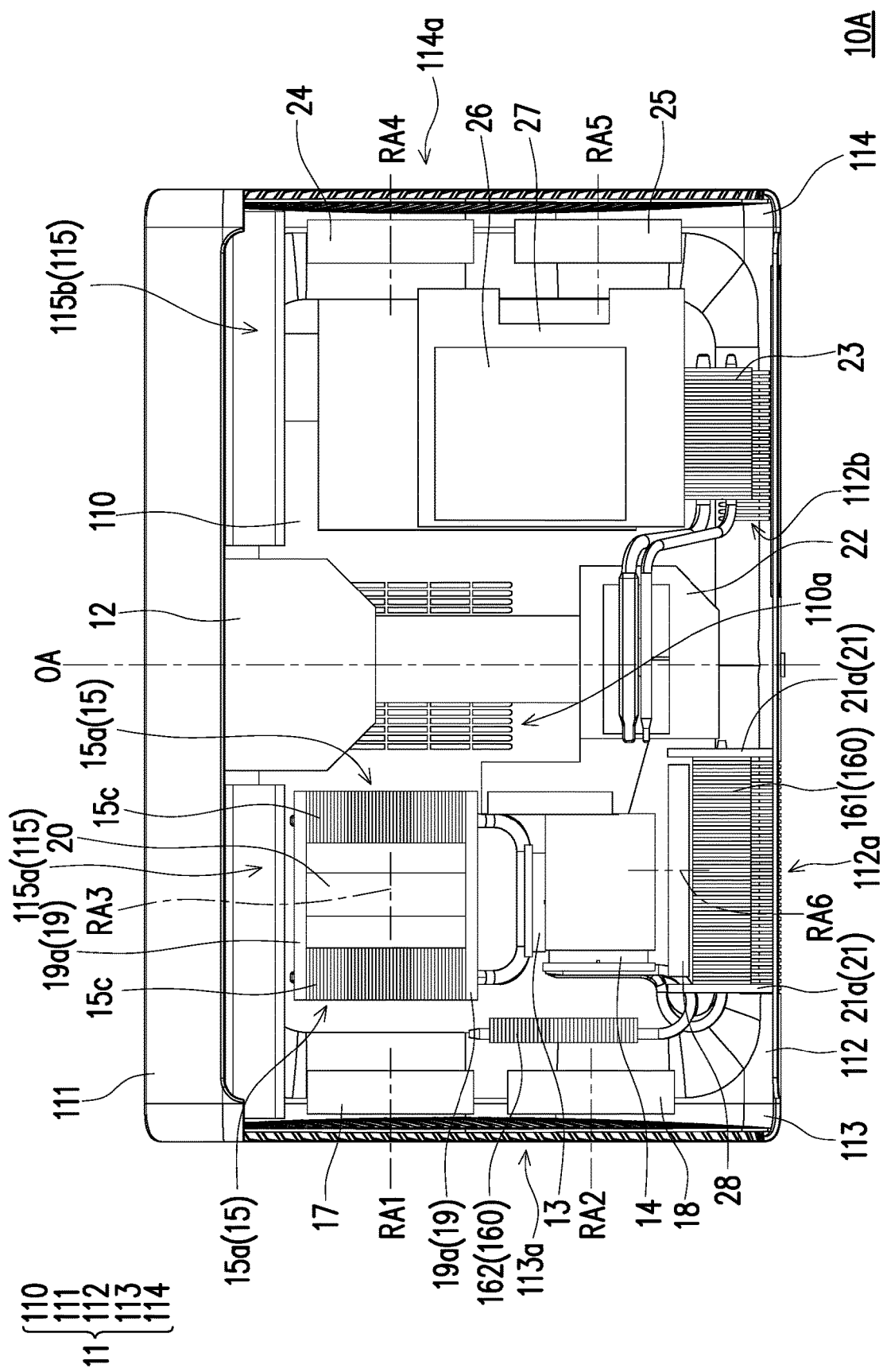
FIG. 4 is a schematic top view of a projection apparatus according to a second embodiment of the disclosure.

FIG. 4 is a schematic top view of a projection apparatus according to a second embodiment of the disclosure. Referring to FIG. 4, a projection apparatus 10A according to this embodiment has substantially the same design principles as the projection apparatus 10 according to the first embodiment, and the main difference are: structural configuration of a second thermal module 160 and that the projection apparatus 10A also includes an auxiliary fan 28 disposed corresponding to the second thermal module 160. Furthermore, the second thermal module 160 includes a thermal fin set 161 and a thermal fin set 162. The thermal fin set 161 and the thermal fin set 162 are both thermally coupled to the second light source module 14 through a heat pipe (not shown). The thermal fin set 161 is disposed corresponding to the second air inlet 112a and is covered by the second air guider 21. In addition, the thermal fin set 162 is disposed between the second light source module 14 and the second fan 18. In addition, the thermal fin sets 161 and 162 are connected to the second light source module 14 through a heat pipe (not shown), for example.

According to this embodiment, the auxiliary fan 28 is disposed in the first area 115a, and the second air inlet 112a and the auxiliary fan 28 are respectively located at two opposite sides of the thermal fin set 161 (including multiple thermal fins). The auxiliary fan 28 may be an axial fan, and a rotation axis RA6 of the auxiliary fan 28 is perpendicular to the rotation axis RA1 of the first fan 17 and the rotation axis RA2 of the second fan 18. In addition, the second air guider 21 covers the auxiliary fan 28, and the rotation axis RA6 of the auxiliary fan 28 is parallel to the two side walls 21a of the second air guider 21 and the thermal fins of the thermal fin set 161 to reduce flow resistance and improve heat exchange efficiency. When the auxiliary fan 28 is running, the auxiliary fan 28 drives the cold air from the second air inlet 112a to flow into the first area 115a, and the cold air exchanges heat with the thermal fin set 161 and thermal fin set 162 in sequence. After that, the second fan 18 forces the hot air out of the first area 115a through the first air outlet 113a.

Figure 5:
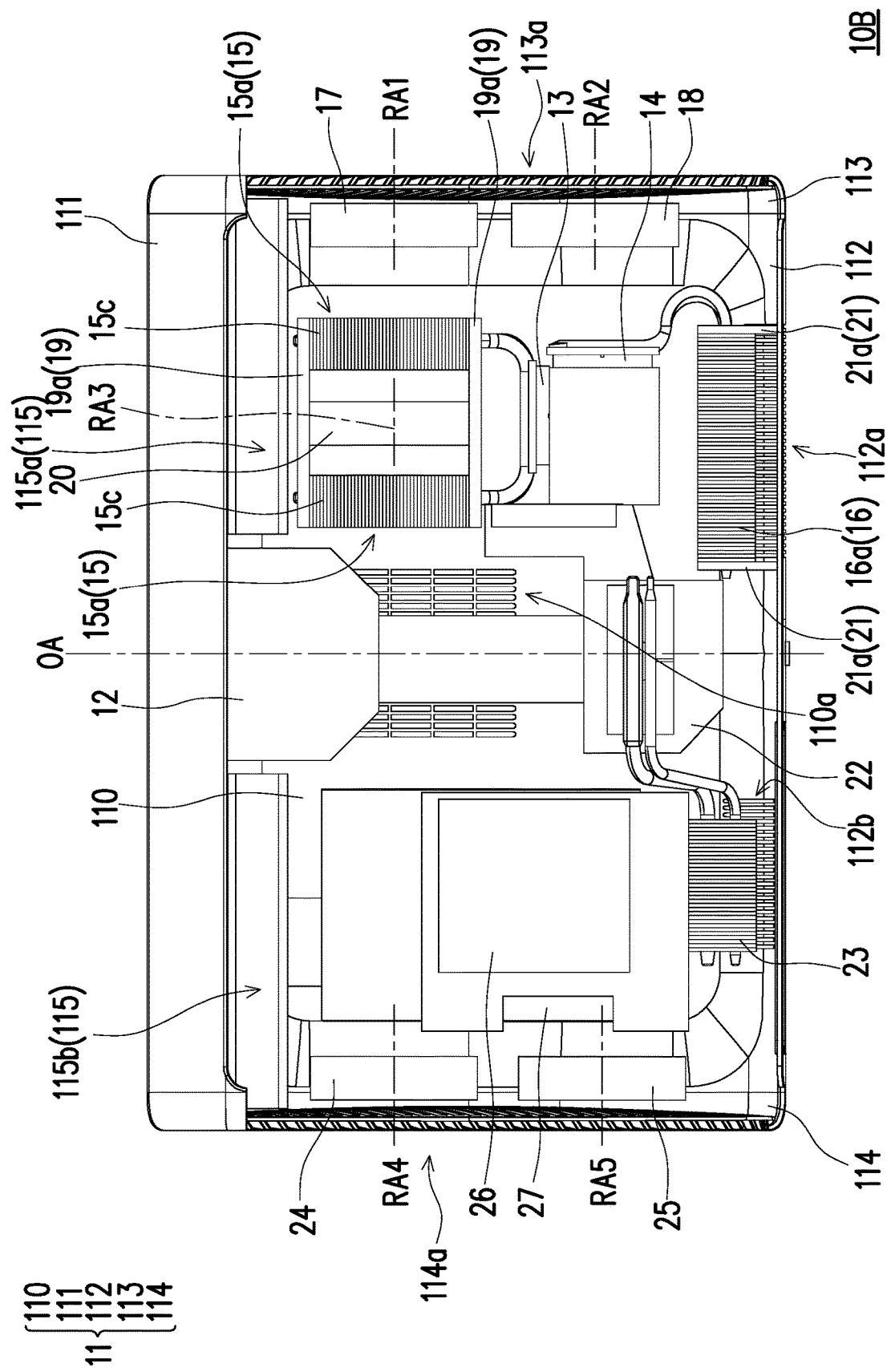
FIG. 5 is a schematic top view of a projection apparatus according to a third embodiment of the disclosure.

FIG. 5 is a schematic top view of a projection apparatus according to a third embodiment of the disclosure. Referring to FIG. 5, a projection apparatus 10B according to this embodiment is a structure of the projection apparatus 10 disposed in the internal space 115, in which the first area 115a and the second area 115b are left-right reversed relative to what shown in FIG. 3.

In summary, the embodiments of the disclosure have at least one of the following advantages or effects. According to the embodiments of the disclosure, heat generated during operation of the first light source module and the second light source module is exhausted to outside of the casing through two different heat dissipation ways, thus helping to improve heat dissipation efficiency of the projection apparatus. Furthermore, the heat generated during the operation of the first light source module is transferred to the first thermal module, and then cold air flowing into the first area from the first air inlet of the bottom cover exchanges heat with the first thermal module to form hot air. On the other hand, the heat generated during the operation of the second light source module is conducted to the second thermal module, and then cold air flowing into the first area from the second air inlet of the rear cover exchanges heat with the second thermal module to form hot air. Finally, the hot air is exhausted from the internal space of the casing through the first air outlet of the first side cover. In addition, the cold air flowing into the first area from the first air inlet of the bottom cover cools the projection lens before flowing to the first thermal module. In other words, the projection lens is located upstream of flow field, so the projection lens may be cooled by cold air to avoid thermal expansion, thus improving the quality of the image projected by the projection apparatus.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus comprising a casing, a projection lens, a first light source module, a second light source module, a first thermal module, a second thermal module, a first fan, and a second fan, wherein:
   the casing comprises a bottom cover, a front cover, a rear cover opposite to the front cover, a first side cover, and a second side cover opposite to the first side cover, wherein the front cover, the rear cover, the first side cover, and the second side cover are disposed around the bottom cover and define an internal space,
   the projection lens is disposed in the casing, wherein the bottom cover has a first air inlet connected to the internal space and corresponding to the projection lens, the first air inlet is located between the front cover and the rear cover, and an extension line of an optical axis of the projection lens divides the internal space into a first area and a second area, wherein the rear cover has a second air inlet connected to the first area, and the first side cover has a first air outlet connected to the first area, and
   the first light source module, the second light source module, the first thermal module, the second thermal module, the first fan, and the second fan are disposed in the first area, wherein the first light source module is thermally coupled to the first thermal module, the first thermal module is located between the first air inlet and the first fan, and the first fan is located between the first thermal module and the first air outlet, wherein the second light source module is thermally coupled to the second thermal module, the second thermal module is located between the second air inlet and the second fan, and the second fan is located between the second thermal module and the first air outlet.

2. The projection apparatus according to claim 1, wherein a rotation axis of the first fan and a rotation axis of the second fan are perpendicular to the extension line of the optical axis of the projection lens.

3. The projection apparatus according to claim 1 further comprising an air guider, wherein the air guider is disposed in the first area, and is located between the first air inlet and the first fan, and the air guider covers the first thermal module.

4. The projection apparatus according to claim 3 further comprising a third fan, wherein the third fan is disposed in the first area, and is located between the first air inlet and the first fan, the air guider covers the third fan, and a rotation axis of the third fan is parallel to a rotation axis of the first fan.

5. The projection apparatus according to claim 4, wherein the first thermal module comprises two thermal fin sets in parallel, and the third fan is disposed between the two thermal fin sets.

6. The projection apparatus according to claim 5, wherein each of the thermal fin sets comprises a plurality of thermal fins, and the thermal fins are parallel to the rotation axis of the third fan.

7. The projection apparatus according to claim 3, wherein the air guider comprises two side walls, and the two side walls are respectively disposed at two opposite sides of the first thermal module along a direction perpendicular to the optical axis.

8. The projection apparatus according to claim 1 further comprising an air guider, wherein the air guider is disposed in the first area, and the air guider is connected to the rear cover corresponding to the second air inlet.

9. The projection apparatus according to claim 8, wherein the second thermal module comprises a plurality of thermal fins, and the air guider covers the thermal fins.

10. The projection apparatus according to claim 9 further comprising an auxiliary fan, wherein the auxiliary fan is disposed in the first area, the second air inlet and the auxiliary fan are respectively located at two opposite sides of the thermal fins, a rotation axis of the auxiliary fan is perpendicular to a rotation axis of the first fan and a rotation axis of the second fan, and the air guider covers the auxiliary fan.

11. The projection apparatus according to claim 9, wherein the air guider comprises two side walls, and the two side walls are respectively disposed at two opposite sides of the second thermal module and arranged along a direction parallel to the optical axis.

12. The projection apparatus according to claim 8, wherein the second thermal module comprises two thermal fin sets, one of the two thermal fin sets is disposed corresponding to the second air inlet and is covered by the air guider, and the other of the two thermal fin sets is disposed between the second light source module and the second fan.

13. The projection apparatus according to claim 1, wherein the projection lens is located in a middle of the internal space.

14. The projection apparatus according to claim 1, wherein the projection lens comprises a reflective ultra short throw projection lens.

15. The projection apparatus according to claim 1, wherein the first light source module and the second light source module each comprises at least one red laser diode, at least one blue laser diode, and at least one green laser diode.

16. The projection apparatus according to claim 1, wherein the second light source module is located between the first light source module and the second air inlet.

17. The projection apparatus according to claim 1 further comprising a digital micromirror device and a third thermal module, wherein the digital micromirror device is disposed in the casing and is thermally coupled to the third thermal module, and the third thermal module is disposed in the second area, wherein the rear cover further has a third air inlet connected to the second area, the second side cover has a second air outlet connected to the second area, and the third thermal module is located between the third air inlet and the second air outlet.

18. The projection apparatus according to claim 17 further comprising a fourth fan and a fifth fan, wherein the fourth fan and the fifth fan are disposed in the second area, and the fourth fan and the fifth fan are located between the third thermal module and the second air outlet.

19. The projection apparatus according to claim 18, wherein a rotation axis of the fourth fan and a rotation axis of the fifth fan are perpendicular to the extension line of the optical axis of the projection lens.

20. The projection apparatus according to claim 18 further comprising a driving circuit and a power supply, wherein the driving circuit and the power supply are disposed in the second area, and are located between the projection lens and the second air outlet.

* * * * *